Aug. 12, 1924.

K. O. B. TEXTORIUS 1,504,728

CORD TIRE BUILDING MACHINE

Filed May 27, 1921   10 Sheets-Sheet 1

Fig. 1.

Inventor

Knut O. B. Textorius

By C. P. Goepel, his attorney

Aug. 12, 1924.

K. O. B. TEXTORIUS 1,504,728

CORD TIRE BUILDING MACHINE

Filed May 27, 1921 10 Sheets-Sheet 2

Inventor
Knut O. B. Textorius
By C. P. Goepel
his Attorney

Aug. 12, 1924.

K. O. B. TEXTORIUS 1,504,728

CORD TIRE BUILDING MACHINE

Filed May 27, 1921 10 Sheets-Sheet 3

Inventor

Knut O.B. Textorius

By C. P. Goepel his Attorney

Patented Aug. 12, 1924.

1,504,728

UNITED STATES PATENT OFFICE.

KNUT O. B. TEXTORIUS, OF NEW YORK, N. Y., ASSIGNOR TO TEX ENGINEERING CORPORATION, OF NEW YORK, N. Y.

CORD-TIRE-BUILDING MACHINE.

Application filed May 27, 1921. Serial No. 473,087.

*To all whom it may concern:*

Be it known that I, KNUT O. B. TEXTORIUS, a citizen of the United States, and resident of the borough of Manhattan, city, county, and State of New York, have invented certain new and useful Improvements in Cord-Tire-Building Machines, of which the following is a specification.

This invention relates to cord tire building machines of that general character disclosed in Patent No. 1,359,632, granted to me on November 23, 1920. In the machine described in this patent there is provided a plurality of synchronously operating mechanisms for applying a layer of cords in one operation throughout the circumferential extent of a tire forming core. Generically considered, it is the primary object and purpose of my present invention to provide a machine having the same ultimate end in view but which is far simpler in its construction, therefore less expensive to produce and not as likely to get out of order and require more or less frequent repair as in the case of the patented machine.

It is one of the important objects of the present improvements to provide an improved construction of the segmental cord receiving and applying means whereby the continuous circumferential layer of cords is applied to the tire forming core. In conjunction therewith I have also devised improved means for actuating the cord end clamping heads so as to securely clamp and hold the ends of the cords upon seating flanges provided on the core.

It is likewise a further object of this invention to provide clamping rings of improved form for engagement with the ends of the successively applied cord layers, whereby the clamping rings may be securely held in superposed relation to each other.

The invention also comprehends the provision of means for removing the forming core and the clamping means for the cord layers from the machine and transferring the same to other machines for the application of additional cord layers.

With the above and other objects in view, the invention consists in the improved cord tire building machine, and in the form, construction and relative arrangement of the several cooperative parts, as will be hereinafter more fully described, illustrated in the accompanying drawings and subsequently incorporated in the subjoined claims.

In the drawings wherein I have shown one desirable and satisfactory embodiment of the invention and in which similar reference characters designate corresponding parts throughout the several views:

Fig. 2$^a$ is an enlarged detail section of the clamping mechanism;

Figure 14ᵃ is a section on the line 14ᵃ—14ᵃ of Fig. 14.

The present invention, like the machine disclosed in my prior patent, provides a series of duplicate mechanisms which are simultaneously operated from a common source of power to apply a continuous circumferential layer of cords upon the periphery of a tire forming core. Any desired number of these duplicate cord applying mechanisms may be employed, but I have found that for certain practical reasons it is preferable to use a quadripartite arrangement with the mechanisms disposed at an angle of 90° with relation to each other. These cord applying mechanisms are grouped around an annular forming core 10 which is supported in concentric relation to a central axial standard 11 rigidly fixed at its lower end in a base 12 of any preferred construction. The core 10 is preferably hollow for the sake of lightness and is, of course, of the usual sectional construction. I have devised an improved sectional core which however constitutes no essential part of the present invention and is, therefore, embodied in a separate application for patent filed of even date herewith and issued as Patent No. 1,408,044 on Feb. 28, 1922. For the purposes of the present explanation it will suffice to state that the core 10 is provided, inwardly of its annular cylindrical portion and at its opposite sides, with the continuous annular cord end seating flanges 13. The several sections of the core are held in assembled relation with their flanges 13, in alignment by means of the annular key 14 which is seated in alignment channels 15 provided in the several sections of the core.

In addition to the flanges 13, the core body is provided in spaced relation to the flange 13 on the underside thereof with a second annular flange 16, which is adapted to be seated upon the spaced angular seating lugs 17 which are fixed to the table 18, rigidly secured in any suitable manner upon the axial standard 11.

Figure 1:
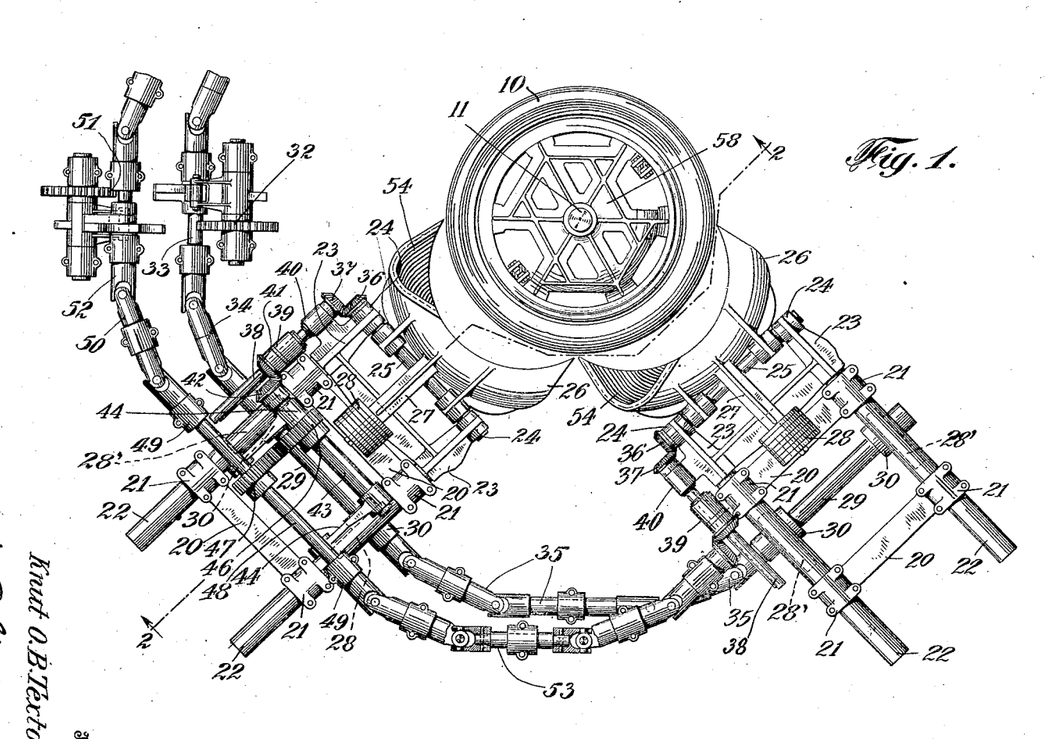
Figure 1 is a top plan view illustrating several of the identical sections of the cord applying mechanism and their arrangement with relation to the tire forming core.
Figures 2, 11:
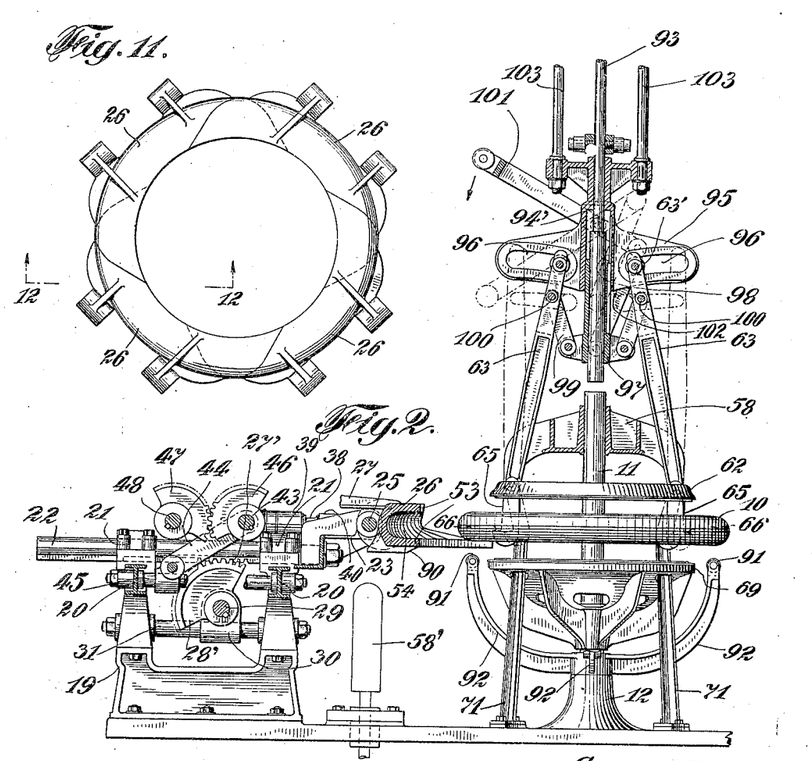
Figure 2 is a sectional view taken on the line 2—2 of Figure 1, and in addition showing the mechanism for removing the core from the supporting table.
Figure 11 is a plan view illustrating the quadripartite construction of the cord holding and applying means, and showing the several segments thereof in the relative positions which they assume upon the tire forming core.
Figure 2:
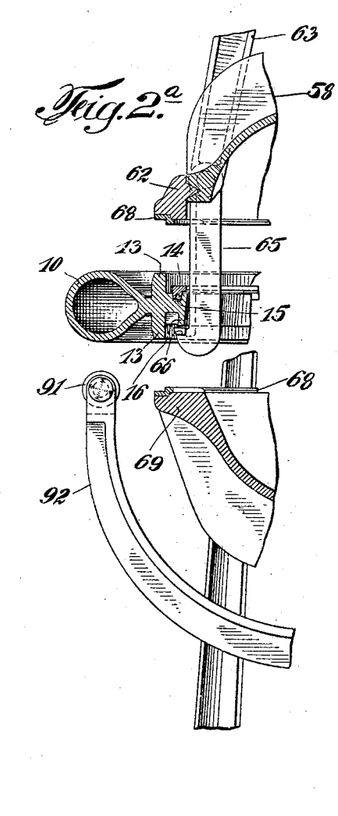

In Figure 1 of the drawings I have shown two of the cord applying mechanisms horizontally arranged in radial relation to the standard 11, which represent one-half of the complete machine. It will be understood that the remaining portion of the machine also consists of two of the cord applying mechanisms arranged in identically the same relation to each other and with respect to the tire forming core as those shown in Figure 1. As the construction of all of the duplicate segmental sections is identical, the following detailed description of one of said mechanisms will suffice for all:

Referring now to Figures 1 to 4 of the drawings, upon a suitable frame structure 19 secured to the base 12 spaced parallel beams 20 are mounted, each of said beams being provided at its ends with a suitable bearing 21 which receives one of the slide rods 22. To the inner ends of the rods 22 the integrally connected longitudinally extending arms 23 are rigidly secured, each of said arms terminating in a bearing 24 which receives a rock shaft 25. Upon this rock shaft the cord receiving and applying segment generally indicated at 26 is suitably fixed. With the body of this segment 26 and at the center thereof, an arm 27 is integrally formed at one of its ends and upon the other end of said arm a counter balancing weight 28 is mounted. This weight serves to normally retain the segment 26 in horizontal position, as seen in Figure 2.

The cord receiving and applying segment is of arcuate or curvilinear form, its longitudinal edges and its peripheral surface being concentric to the radius of curvature of the tire forming core 10. The end edges of the segment 26 are obliquely cut and extend in parallel relation to each other in lines other than 90°.

The lower side of each of the slide rods 22 is flattened and provided with a rack 27' with which the gear segments 28' respectively engage. These spaced gear segments are fixed upon a common shaft 29 mounted in bearings 30 secured upon the rods 31 fixed in the frame structure 20. Rotation is imparted to the shaft 29 from a primary source of power through the medium of a suitable gearing 32, the driven shaft 33 being flexibly connected to one end of the shaft 29 by the shaft section 34 having a universal connection to the shafts 29 and 33. Similar flexible power transmitting elements 35 operatively connect the shafts 29 of the two adjacent cord applying mechanisms on one side of the machine and the corresponding shafts of the other mechanisms located at the opposite side of the machine are in a similar manner connected to the other end of the shaft 33. This shaft is intermittently actuated through the medium of the gearing 32 so as to rotate the shafts 29 at the proper times and in the proper directions to move the segmental cord holders in unison from the position seen in Figure 2 to the position shown in Figure 4 and to then retract the same to their former positions.

Upon one end of the shaft 25 a beveled gear 36 is fixed and meshes with a similar beveled gear 37 at one end of the shaft 38 which is mounted for axial movement in a bearing 39 at one end of the beam 20 and is also rotatably supported in a bearing 40 on one of the arms 23. A second beveled gear 41 is keyed upon said shaft and meshes with a complementary beveled gear 43 on one end of a shaft 43. This shaft is journaled in the supporting arms 44 which are rigidly fixed upon rods 45 connecting the beams 20 to each other. A gear segment 46 is fixed upon the shaft 43 and meshes with a similar gear segment 47 on the shaft 48, said latter shaft being journaled at its ends in suitable bearings 49. One end of this shaft is operatively connected by the shaft section 50 to the driven shaft 52 of a second operating gearing 51 actuated from the primary source of power. The other end of the shaft 48 is connected by the flexible power transmission means 53 to the corresponding shaft of an adjacent cord applying mechanism. The mechanisms at the opposite side of the machine have their shafts 48 also connected to the operating gearing in the same manner as just described.

Figure 3:
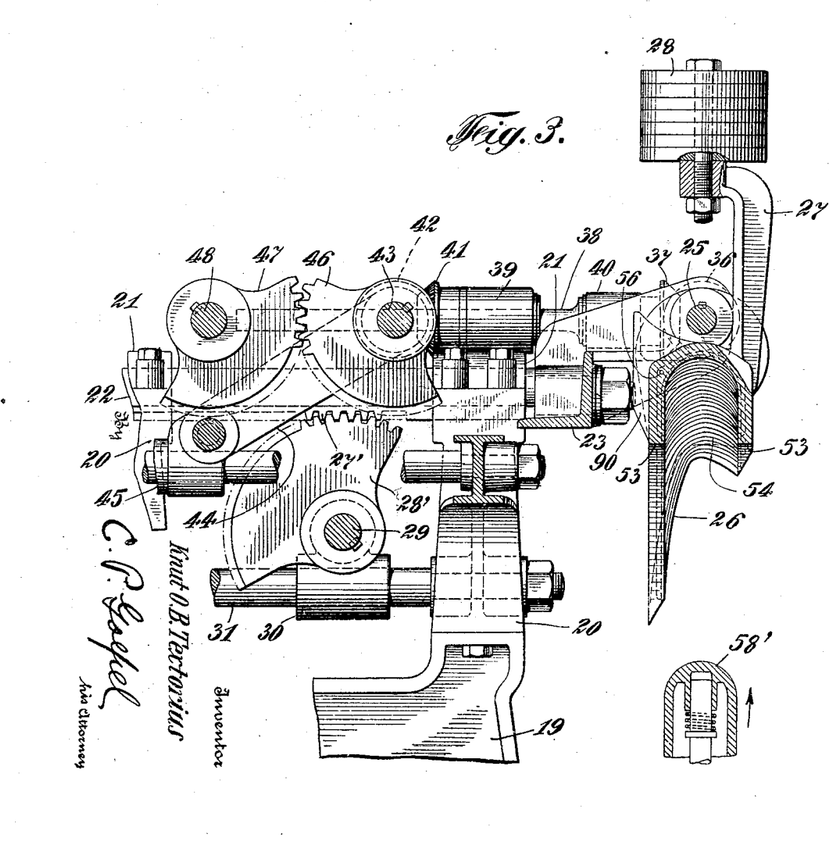
Figure 3 is an enlarged vertical section through a portion of the machine showing the cord holding and applying member in position to receive the series of cords which constitute one section of the complete cord layer.

It will be evident from the above description that upon the rotation of the shaft 48, through the medium of the segmental gears 46 and 47, the shaft 43 is likewise rotated and through the gears 36, 37, 41 and 42 the shaft 25 is rocked to swing the cord applying segment 26 from a horizontal to a vertical position, as shown in Figure 3, or vice versa.

Figures 12, 13:
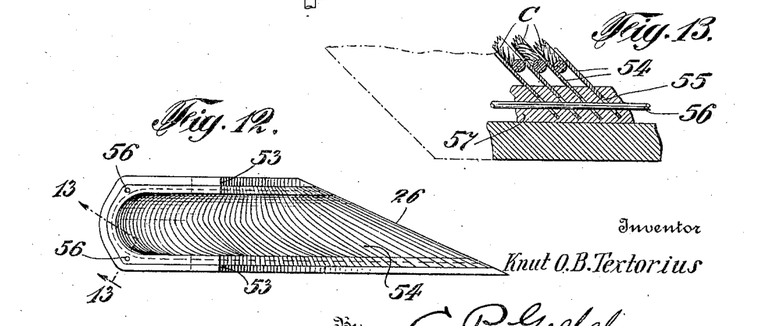
Figure 12 is a detail elevation showing the cord holding means carried by each of the cord applying members.
Figure 13 is an enlarged detail section taken on the line 13—13 of Figure 12.

Each of the cord receiving and applying segments 26 consists of a concavo-convex shell having a longitudinally continuous intermediate portion of substantially semicircular form in cross section and longitudinal edge portions indicated at 53 extending from said intermediate portion in parallel relation to each other. Within each of these segments 26 a multiplicity of thin flexible sheet metal fins or plates 54 are arranged in spaced relation to each other, said plates being obliquely inclined with respect to the longitudinal axis of the segment and likewise inclined transversely thereof, as shown in Figure 13 of the drawings. Any preferred means may be employed for securing these metal plates within the cord applying segment, but for this purpose I have herein shown each of said plates provided with openings 55 which in the present instance are located at opposite sides of the intermediate curved portion of the plate. Through the aligned openings of the series of plates 54 wires 56 are threaded and Babbitt metal or other suitable binding material indicated at 57 is poured between said plates and around the wires 56. The thickness of the Babbitt metal 57 is less than the width of the fins or plates 54 so as to provide the free edge portions of the plates capable of flexing movement with respect to each other and designed to receive between them the individual cords C. These cords are assembled upon a cord receiving piston 58', each of the cords being coated with an adhesive rubber composition solution. It will be understood that the cords are arranged at the proper predetermined angle so that when the piston 58' is actuated and moved upwardly from the position shown in Figure 3, the cords thereon are forced between the free edges of the plates or fins 54. Thus when the piston 58' is withdrawn or lowered the series of cords will be properly held in the segment 26 in the same angular positions which they formerly occupied upon the piston. However, in so far as the present application is concerned, any other desired means may be employed for positioning the cords in the segment 26.

Figure 4:
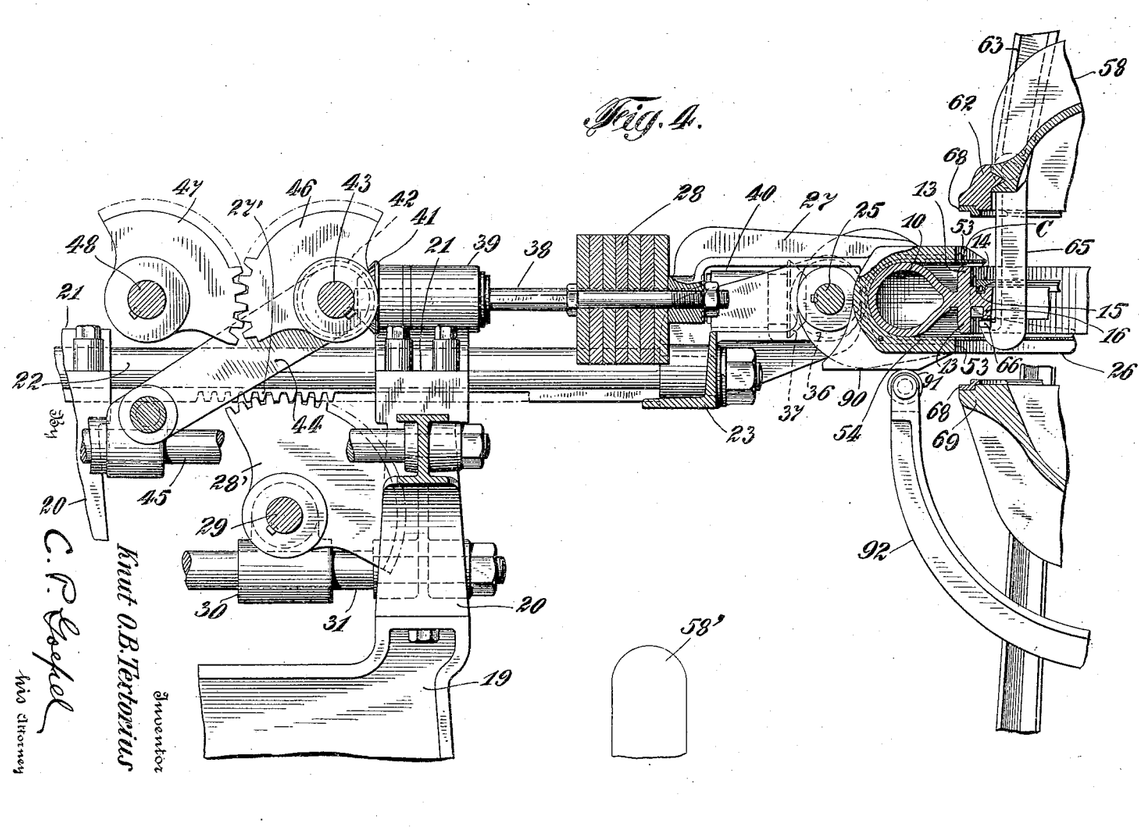
Figure 4 is a view similar to Figure 3, showing the cord applying member in its projected position and embracing the tire forming core.
Figure 5:
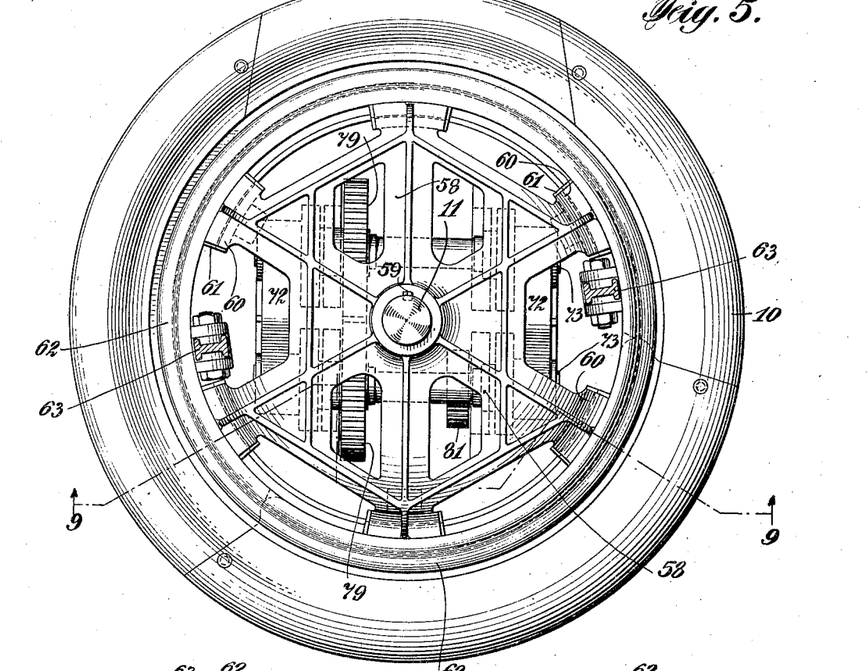
Figure 5 is a top plan view of the upper head and the core, illustrating the annular carrier for the cord end clamping ring latched to the head.
Figure 6:
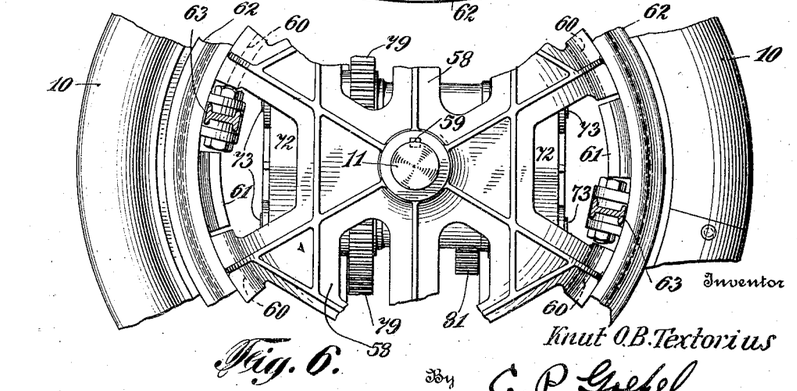
Figure 6 is a fragmentary plan view showing the ring carrier released from the clamping head.

Upon reference to Figure 4 of the drawings, it will be observed that the cords C are of such length that when applied to the core 10 they will extend inwardly from the cylindrical body of the core and the end portions thereof, which project beyond the parallel portions 53 of the segment 26, will be disposed over the edges of the flanges 13 of the core. In order that the cords may be tightly held under tension upon the forming core, I have provided means for securely clamping the cord ends in position on the flanges 13. This clamping means I have fully illustrated in Figures 7, 8 and 9 of the drawings. The upper head 58 in the form of a spider is keyed for longitudinal movement upon the fixed standard 11 as shown at 59. The spaced marginal portions of this head are each provided with a groove 60 to receive latch tongues 61 on a ring or annulus 62. To the inner side of this ring or annulus, at diametrically opposite points, levers 63 are pivoted as at 64, each of said levers having a lower end portion 65 disposed at a slight angle with respect to the lever portion extending above the pivot 64. The end portion 65 of each lever terminates in an outwardly turned lifting hook 66, the purpose of which will be hereinafter more fully explained. The lower face of the ring 62 is rabbeted as at 67 for the purpose of receiving the clamping ring 68.

The lower clamping head 69 is also keyed upon the standard 11 and is likewise of skeletonized construction. This head has a continuous marginal portion, the upper surface of which is rabbeted as at 70 to receive one of the clamping rings 68. The supporting legs 71 for the table 18 are fixed at their lower ends to the machine base and extend upwardly through openings in the wall of the head 69.

Figure 14:
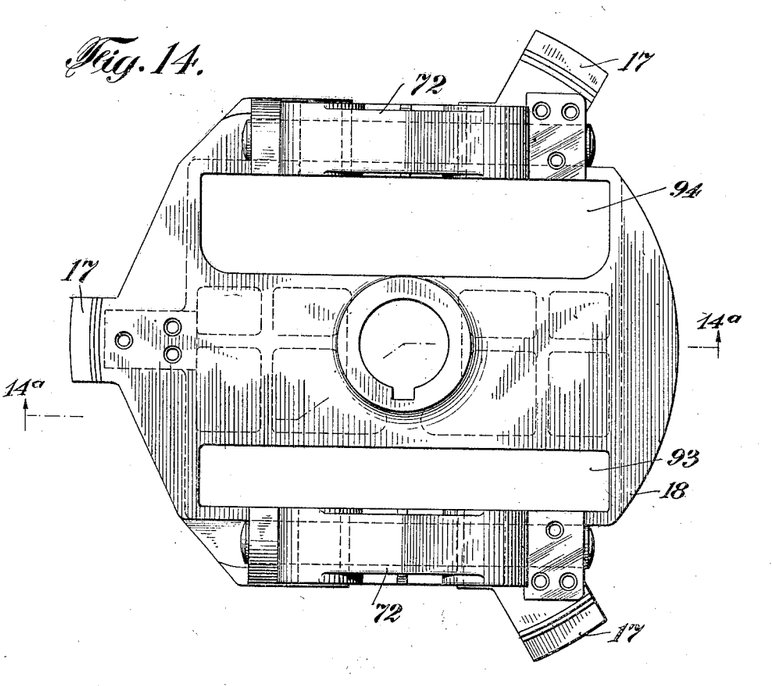
Figure 14 is a detail plan view of the core supporting table with the bearing assembly for the operating eccentrics for the clamping heads.

Upon the table 18 spaced bearing castings 72 are mounted in fixed relation to each other as shown in Figure 14 of the drawings, said castings extending above and below the plane of the table and having spaced bearings at their opposite ends to receive the shafts 73 and 74 respectively. Upon the shafts 73 and adjacent each end thereof, an eccentric 75 is fixed. These eccentrics operate within spaced yokes 76 depending from the body wall of the head 58. It will be observed that two of the eccentrics are engaged in each of the yokes, the eccentrics in each pair being located at relatively opposite sides of the vertical central line of the machine so as to impart a uniform thrust to the head and obviate lateral binding thereof against the standard 11. This insures the free and unretarded movement of the head.

Upon each of the lower shafts 74, spaced eccentrics 77 are also secured and operate in the spaced yokes 78 extending upwardly from the body wall of the lower clamping head 69. In this case also the corresponding eccentrics 77 on the shaft 74 co-operate with the same yoke.

Figures 7, 10:
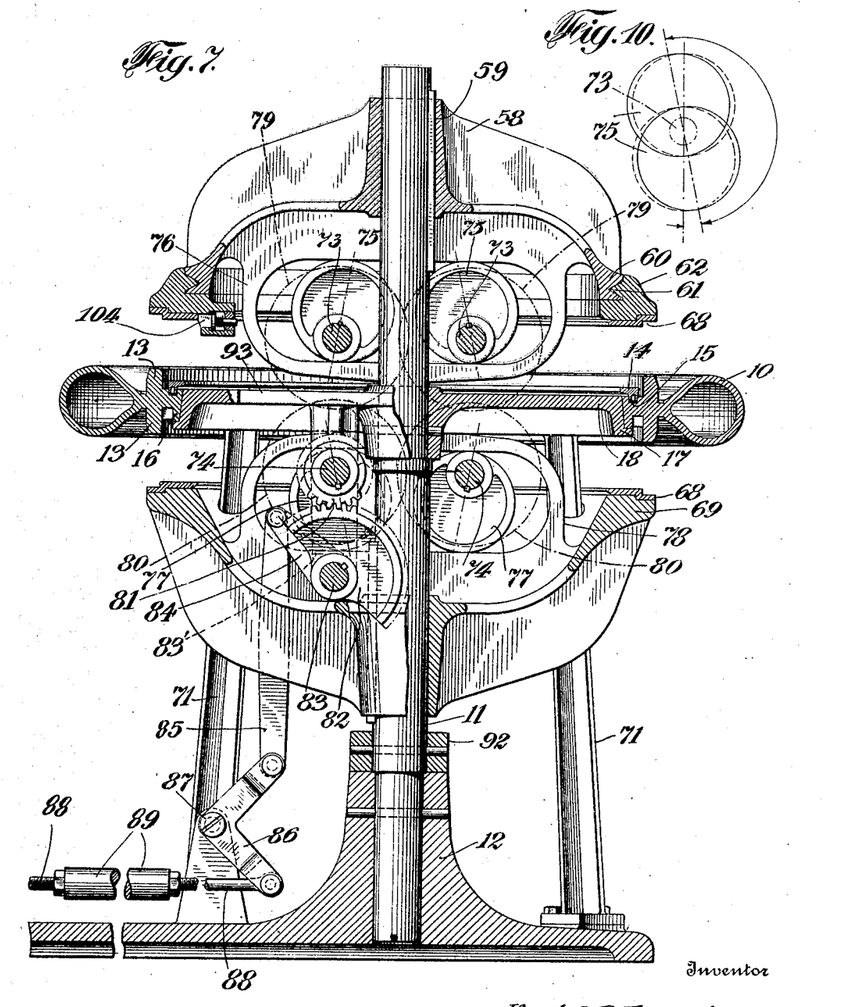
Figure 7 is a vertical section taken on the line 7—7 of Figure 9, showing the operating gearing and eccentrics for the vertically movable clamping heads.
Figure 10 is a diagrammatic view illustrating the adjustment of the operating eccentrics for the heads.
Figure 8:
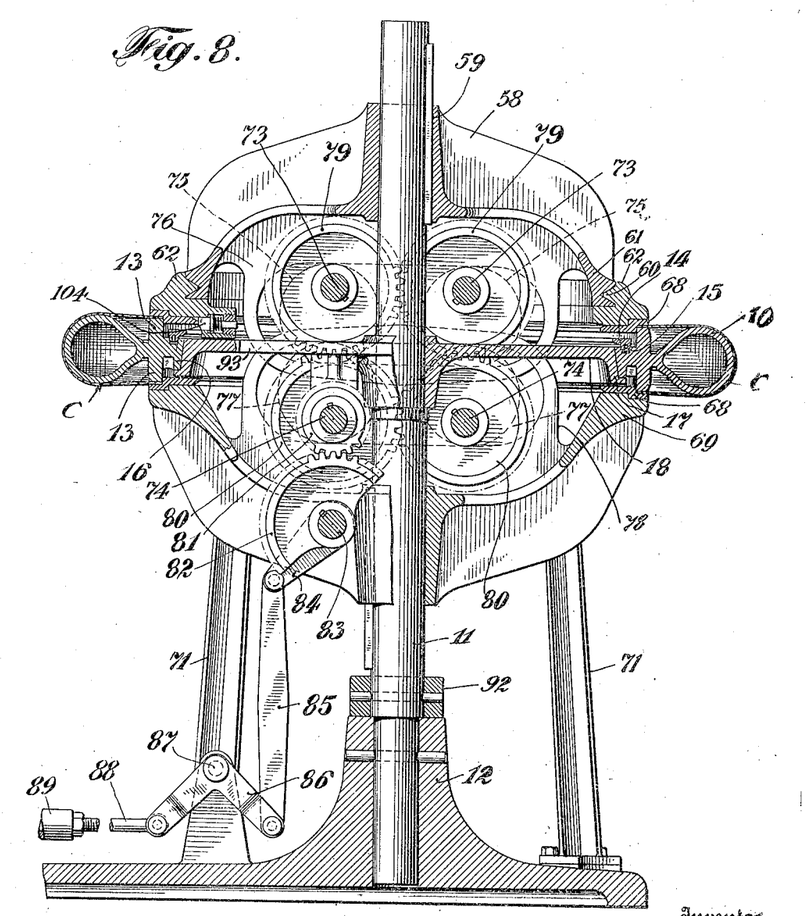
Figure 8 is a similar view showing the relative positions of the parts with the heads in clamping engagement with relation to the tire forming core.

Referring now to Figure 8 of the drawings, it will be noted that a gear 79 is fixed to each of the upper shafts 73, said gears meshing with each other and also having meshing engagement with the gears 80 of the same diameter, which are fixed upon the lower shafts 74, the gears 80 likewise meshing with each other. In addition to the gears 80, a pinion 81 is fixed upon one of the shafts 74 and is operatively engaged by gear segment 82 which is secured upon one end of a rock shaft 83, journaled in a suitable bearing 83' provided therefor and formed on an extension of the central bearing 74' for the shaft 74, provided on the underside of the table 18 at one side of the standard 11. An arm 84 is fixed to the other end of this rock shaft and a lever 85 connects this arm 84 to one arm of a bell crank lever 86 fulcrumed as at 87 upon the face 12. To the other arm of the bell crank lever 86 a reciprocable actuating rod 88 is connected, a turn buckle or other suitable adjusting means 89 being interposed in the length of this rod. By the adjustment of the turn buckle 89, the eccentrics 75 and 77 may be readily adjusted as indicated in Figure 10 of the drawings so as to regulate the throw of the eccentrics or the extent of movement transmitted thereby to the heads 58 and 69 in the actuating movement of the rod 88. When this rod is actuated through any suitable mechanical means by the operating gearing, such for instance as that disclosed in my issued patent, the heads 58 and 69 are simultaneously moved towards or away from each other upon the standard 11 whereby the clamping rings 68 will be positioned in tight clamping engagement against the cord ends and securely hold the same upon the flanges 13 of the forming core.

For the purpose of insuring the proper positioning of the cord ends in opposed relation to the seating faces of the flanges 13, I provided the underside of each cord applying segment 26 with a rib 90 which is adapted to ride over and upon a roller 91 mounted in the upper end of an arm 92 which is fixed in any suitable manner to the machine base.

As shown in Figure 14 of the drawings, the angular supports 17 of the table upon which the core 10 is removably supported are spaced apart for a distance of preferably 120° and in addition the table is also provided with the slots 93 and 94, the slot 93 accommodating one pair of eccentrics 75 and one pair of eccentrics 77, while the other slot 94 accommodates the other pairs of eccentrics and the gears 79 and 80. The table is of general rectangular form and the lower end portions 65 of the levers 63 are disposed between the radially projecting core supports 17.

The carrying ring 62 and the tire forming core with the clamping rings holding the applied layer of cords thereon are removed from the machine and transferred to a second machine of like character where another layer of cords is applied in superposed relation to the first layer, but extending at right angles to the latter. This transferring means in one of its embodiments is shown in Figure 2 of the drawings. A suitable hoisting mechanism is connected to the rod 93 and upon this rod a tubular head 94' is fixed, said head having the arms 95 extending laterally from opposite sides thereof and each provided with an arcuate slot 96 therein. The upper end of each of the levers 63 carriers a roller 63' movable in one of the slots 96. A longitudinally movable sleeve 97 is engaged upon the lower end of the rod 93 and extends upwardly in the head 94 and is keyed thereto, as at 98, so as to prevent relative rotation. The lower end of the sleeve 97 is connected at its opposite sides by the links 99 to the respective levers 63, the pivotal connections 100 between said links and levers being located in spaced relation to the roller 63'. The sleeve 97 is actuated by means of a lever 101 fulcrumed intermediate of its ends upon the head 94 and connected by links 102 to the lower end of said sleeve.

Figure 9:
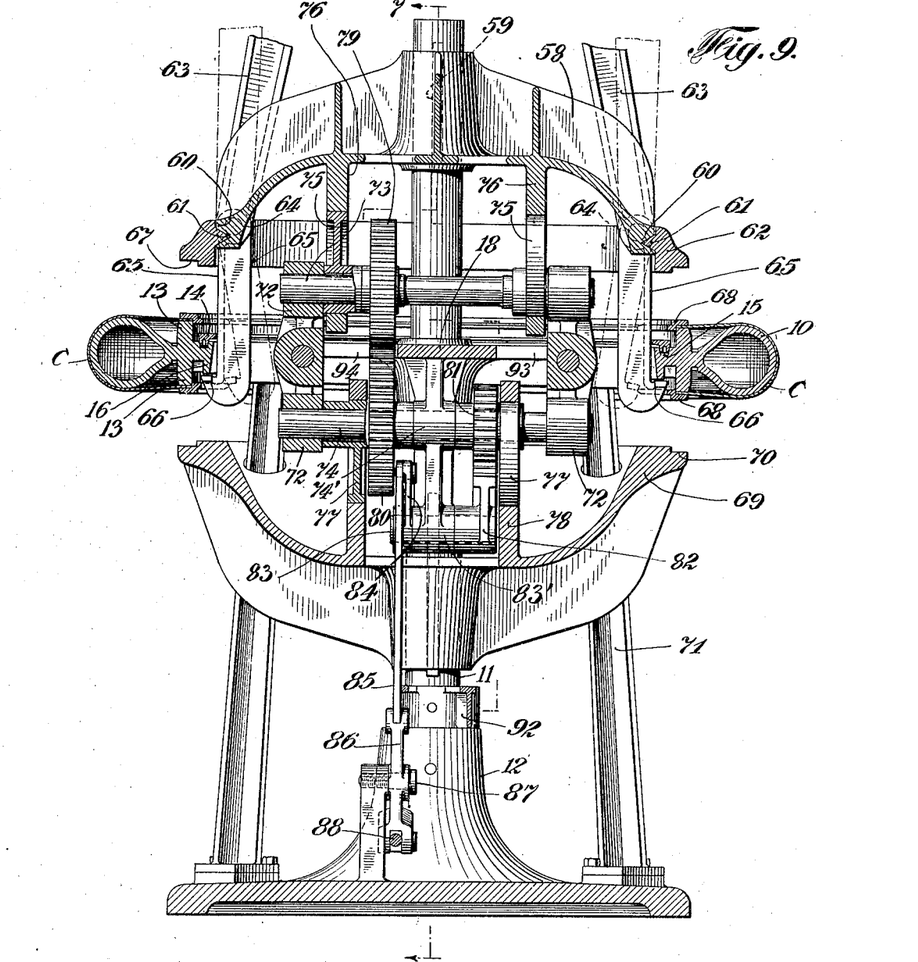
Figure 9 is a section taken on the line 9—9 of Figure 5.

During the operation of the head 58 and 69 to apply the clamping rings to the ends of the cord layer, the levers 63 are in the dotted line positions shown in Figures 2 and 9, the carrier 62 being latched to the head 58. In the vertical movement of said head it will be understood that the lever 63, the head 94 and the sleeve 97 all move together as a unit. After the head 58 is returned to the position seen in Figure 9, the carrier 62 is circumferentially moved upon said head by the application of a lateral pressure against the rods 103 connected to the upper end of the head 94 in relatively opposite directions. The latch tongues 61 on the carrier 62 will thus be moved out of engagement with the grooves 60 of the head 58. The lever 101 is now moved from the dotted line position to the full line position seen in Figure 2, thereby forcing the sleeve 97 downwardly on the rod 93 and through the medium of the links 99 pulling the upper ends of the levers 63 inwardly. The lower end portions 65 of these levers are thus moved outwardly and the hooks 66 thereon are engaged beneath the flange 16 on the tire forming core. When the hoisting mechanism is now operated, it will be obvious that the carrier 62, together with the forming core having the layer of cords thereon, will be lifted above the head 58 and the upper end of the standard 11. The hoisting mechanism is carried by a suitable traveling crane so that the core may be transferred to another location and properly positioned with relation to a second machine for applying the next layer of cords.

The carrier 62 may be provided with spring pressed latch pins 104, as shown in Figure 7, to engage the inner edge of the annular clamping ring, which is disposed in the lower rabbeted face of the carrier. It will be understood that these clamping rings are very light in weight and the latch pins 104 are provided only for the purpose of compensating for such wear as may occur and thus assuring the retention of the clamping ring upon the lower face of the carrier.

Figure 15:
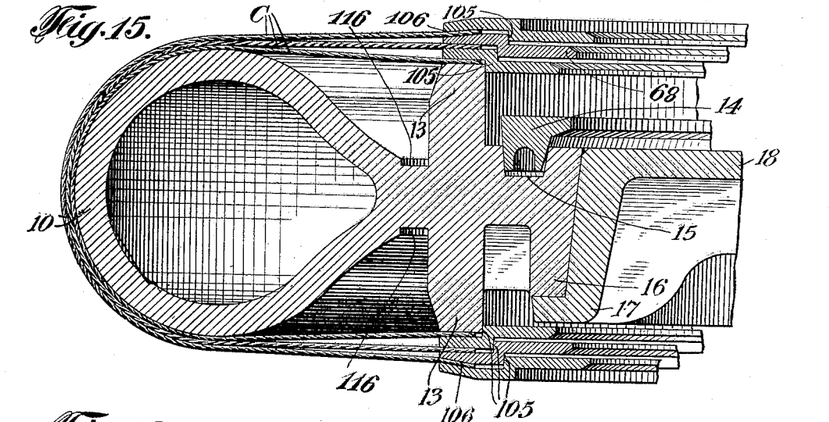
Figure 15 is an enlarged transverse sectional view through one side of the core, showing a plurality of cord layers having the ends thereof secured upon the core by the clamping rings.
Figures 16, 17, 18, 19, 20, 21:
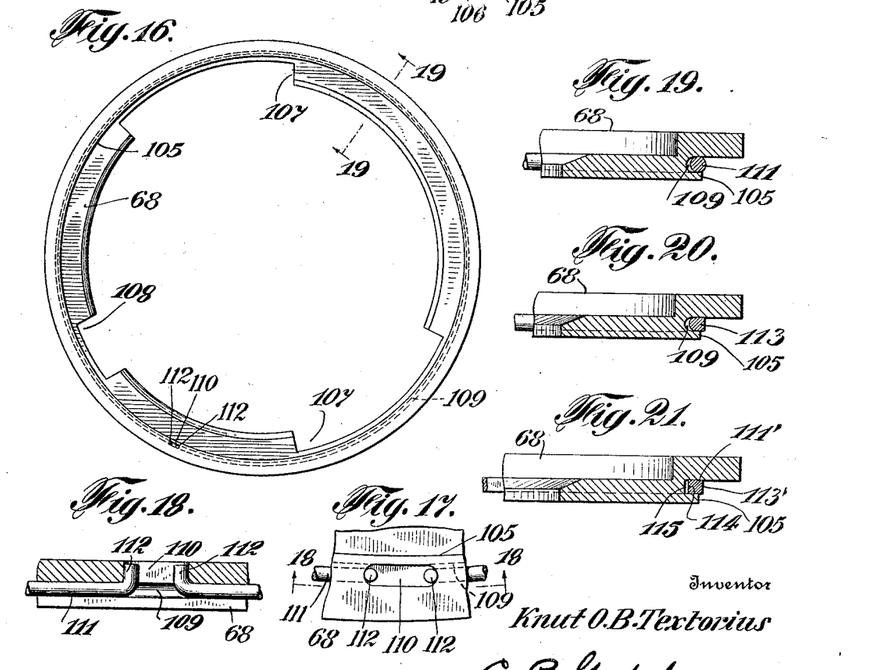
Figure 16 is a detailed plan view of one of the clamping rings.
Figure 17 is an enlarged fragmentary plan view illustrating the manner of mounting the resilient friction band in the peripheral face of the ring.
Figure 18 is a section taken on the line 18—18 of Figure 17.
Figures 19, 20 and 21 are sectional views illustrating several forms of the resilient friction bands, whereby the clamping rings are securely held in superposed relation to each other.

In Figure 15 of the drawings, I have illustrated a plurality of the clamping rings 68 as applied after a plurality of layers of cords have been disposed in superposed relation upon the tire forming core. Each of these clamping rings is provided intermediate of its inner and outer edges with an angular continuous annular shoulder 105 so that the inner and outer edge portions of the ring are located in different horizontal planes. The contacting faces of the shoulders 105 on the superposed rings are slightly beveled or inclined so as to produce a frictional wedging action whereby relative displacement of said rings and the release of the cord layers as the result of such displacement is precluded. The outer edge portions of certain of the clamping rings also preferably have their cord engaging surfaces beveled or inclined as at 106, so as to more effectively clamp the cords in place and maintain the same under the requisite tension. In Figure 16 I have shown the inner portion of the clamping ring circumferentially recessed or cut away at spaced points as at 107, which spaces accommodate the lower end portions 65 of the levers 63 and permit of their circumferential movement with respect to the clamping rings. The clamping ring is provided with the additional cut out or recesses 108 in its inner edge. When the lower ends of the levers 63 are engaged beneath the flange 13 on the core as above explained, and said core, together with the ring carrier 62 rotated with respect to the head 58, so as to release the carrier from said head, the angular core supports 17 of the table will be in alignment with the recesses 107 and 108 of the clamping rings so that the core with the cord holding rings may be lifted and transferred to the next machine in the series without encountering parts of the table 18.

In order to securely hold the several superposed clamping rings 68 in engagement upon the ends of the cord layers as shown in Figure 15 and to prevent their relative movement, the outer face of the annular shoulder 105 of each ring is provided with a circumferential groove 109 and with this groove an elongated opening or slot 110 formed in the ring body communicates. It will be noted from reference to Figure 17 of the drawings that the width of this slot is appreciably greater than the diameter of the groove. Within the groove 109 a resilient friction band 111 is disposed. In one embodiment, this band is in the form of a cylindrical steel wire of requisite gauge having a normal diameter greater than the external diameter of the shoulder 105 of the ring so that the friction band 111 at its outer side projects beyond the peripheral face of this shoulder, as seen in Figure 19. The ends of the band 111 are angularly bent as at 112 and are engaged within the slot 110, the ends of said band being normally seated against the opposite end walls of the slot 110. In this normal position of the band, it is spaced from the base wall of the groove 109 so as to permit of the circumferential contraction of said band when two rings are nested in superposed relation as in Figure 15. The outer side of the band 111 engaging the inner face of the shoulder 105 on one ring causes the contraction of said ring and thereby increases the frictional pressure of the band 111 against the shoulder 105, the ends 112 of the band moving freely in the slot 110. In this manner, it will be apparent that the superposed rings are practically locked against relative moment and securely retained in clamping engagements upon the ends of the respective cord layers.

In Figure 20 I have shown a slightly different form of the friction band 111, wherein said band has a convex inner face opposed to the semi-cylindrical groove 109 in the clamping ring while the outer face 113 of said band is flat. Preferably, this flat surface is vertically inclined so as to produce a slight wedging action against the face of the ring shoulder 105.

In Figure 21 I have shown another form of the friction band and in this case the band 111' is of approximately rectangular cross sectional form, the flat inner face 114 thereof being opposed to the base wall of the rectangular groove 115 in the face of the shoulder 105. The outer peripheral face 113' of the friction band is vertically inclined as in the construction shown in Figure 20. Any one of these several forms of the friction band for the clamping rings will efficiently subserve the intended purpose. It will, however, be apparent that it is possible to modify the form, construction and arrangement of this feature of the invention in many other respects.

In the operation of the machine as above described, after the individual cords of the proper length have been disposed upon each of the pistons 58' associated with the respective cord holding and applying segments 26, these segments are swung from the horizontal position seen in Figure 2 of the drawings, downwardly to the vertical position shown in Figure 3. The cord pistons 58' then move upwardly into the respective segments 26 and press or force the individual cords between the obliquely disposed fins 54. The pistons are then retracted and the operation of the gearing 32 is reversed to swing the segments 26 upwardly to their former horizontal positions in which positions they are retained against casual oscillation upon the respective shafts 25 by means of the counter balancing weights 28. Through the medium of the operating gearing 51, the segmental cord holders 26 are now simultaneously projected inwardly radially of the core center, the segments being guided in their horizontal movement by the rollers 91 to the position seen in Figure 4 of the drawings, wherein each segment will closely embrace the core body. Upon reference to Figure 11 it will be observed that when the cord holding segments are moved into embracing relation to the core, the obliquely inclined end edges of adjacent segments 26 extend in parallel relation and are in substantial contact with each other. In other words, the several segments 26 entirely cover the peripheral surface of the core and there are no gaps or spaces between these segments. Thus, the cords C carried by the several segments are simultaneously applied upon the entire surface area of the core in the form of a single layer of cords positioned uniformly in spaced relation to each other and in the same angular relation to the axis of the core.

As shown in Figure 4 of the drawings, the ends of the cords carried by each segment 26 extend beyond the longitudinal edges of the segment so that they project over the flanges 13 on the core 10. The carrier 62 on the head 58 and the head 69 having been provided with the clamping rings 68, the eccentrics 75 and 77 are now actuated by movement of the rod 88 to simultaneously move said heads in relatively opposite directions upon the standard 11 from the positions shown in Figure 7 to the positions seen in Figure 8, wherein it will be observed that the outer portions of the clamping rings have been brought into clamping engagement with the cord ends, said rings tightly clamping or compressing the ends of the cords against the seating faces of the flanges 13 and the shoulders 105 of the rings frictionally fitting against the inner side faces of said flanges. The layer of cords is thus held under proper tension upon the peripheral surface of the core body and prevented from loosening or in any way changing their positions relative to the core axis.

The heads 58 and 69 are now returned to their former positions as shown in Figure 9. The levers 63 are then moved to the full line positions shown in Figure 9 and the hooks 66 engaged beneath the flange 16 of the core. The ring 62 having been circumferentially shifted to unlatch the same from the head 58 the hoisting mechanism is operated to lift the core with the cord layer clamped thereon from the machine. The core is now transferred to a similar machine and lowered into position upon the table 18 thereof. This machine differs from that herein described only in the fact that the plates or fins 54 of the cord holding segments are arranged at a reverse angle so that the next layer of cords which are applied in superposed relation to the previous cord layer will extend over the forming core at right angles to the angular direction of the first cord layer. Additional clamping rings 68 hold the successive cord layers in place in proper superposed relation to each other, as indicated in Figure 15, until the requisite number of cord layers have been applied. Finally the core with the plurality of cord layers assembled thereon is transferred to the end machine of the series where bead rings are applied to the marginal portions of the cord laminations by forcing said marginal portions and the bead rings into the grooves or channels 116 of the core body, somewhat in the manner disclosed in my prior patent, above referred to. However, this means for applying the beads does not constitute an essential part of the present invention.

From the foregoing description, considered in connection with the accompanying drawings, it will be appreciated that I have materially simplified the construction of the machine as disclosed in my prior patent, enabling the operation thereof with maximum rapidity so as to materially increase quantity production of tires of this character.

It will, of course, be understood that the cord delivering pistons, the cord holding segments and the clamping heads are operated in properly timed relation to each other. Various motion transmission mechanisms might be utilized for this purpose, such for instance as that disclosed in my former patent and, therefore, I have not herein referred to such primary operating means in detail. It may however, be stated that in a co-pending application for patent filed September 27, 1921, Ser. No. 503,677 I have fully described an improved operating mechanism which may be advantageously employed in connection with the machine forming the subject matter of the present application, as well as in connection with the various other machines which may operate to secure different final results.

In the foregoing I have described what I believe to be a very practical and serviceable embodiment of the present invention, but it will be manifest that the several co-operating parts of the machine are susceptible of numerous mechanical modifications and that the same general results might be obtained by means of other alternative structures. Accordingly, the privilege is reserved of resorting to all such legitimate changes in the form, proportion and relative arrangement of the several parts as may be fairly embodied within the spirit and scope of the invention as claimed.

I claim:

1. In a cord tire building machine, in combination with a tire forming core, a cord holder mounted for bodily swinging movement, and means for swinging said holder from a cord receiving position in angular relation to the core to a position in radial alignment therewith.

2. In a cord tire building machine, in combination with a tire forming core, a cord holder mounted for bodily swinging movement upon an axis coinciding with the median plane of said core, and means for swinging said holder from a cord receiving position in angular relation to the core to a position in radial alignment therewith.

3. In a cord tire building machine, in combination with a tire forming core, a cord holder mounted for bodily swinging movement upon an axis coinciding with the median plane of said core, means for swinging said holder from a cord receiving position in angular relation to the core to a position in radial alignment therewith, and additional means for rectilinearly moving the cord holder when in the latter position to apply the cord held thereby to the peripheral surface of the tire forming core.

4. In a cord tire building machine, in combination with a tire forming core, a cord holder, a rectilinearly movable support upon which said cord holder is mounted for bodily swinging movement, means for swinging the cord holder from a cord receiving position in angular relation to the tire forming core to a position in radial alignment therewith, and additional means for rectilinearly moving the support to advance the cord holder and position the cords carried thereby upon the forming core and to subsequently retract said holder.

5. In a cord tire building machine, in combination with a tire forming core, means for applying a layer of cords upon the entire circumferential area of the core, said means comprising a series of cord holders, each supported for rectilinear movement and for bodily swinging movement, and means associated with each of the holders to operate said holders in unison and swing the same from their cord receiving positions in angular relation to the forming core to positions in radial alignment therewith, and to then simultaneously advance said cord holders to position the cords carried thereby upon the tire forming core.

6. In a cord tire building machine, in combination with a tire forming core, means for applying a layer of cords upon the entire circumferential area of said core comprising a plurality of curvilinear cord holders, each mounted for rectilinear and bodily swinging movement, said holders each consisting of a single part having a cross sectional form conforming to the body of the tire forming core and a mechanism associated with each of said cord holders to operate the same in unison and swing said holders from cord receiving positions in angular relation to the core to positions in radial alignment therewith, and to then simultaneously advance the holders into embracing relation to the core to position the cords in the respective holders upon the core surface.

7. In a cord tire building machine, in combination with a tire forming core, a cord holder mounted for rectilinear and bodily swinging movement, means for swinging the holder to a cord receiving position in angular relation to the core, counter balancing means connected to the holder to return the same to normal position in radial alignment with the core, and means for advancing the holder to position the cords carried thereby upon the surface of the core and for then retracting said holder.

8. In a cord tire building machine, a cord holding segment for applying the cords to a tire forming core, said segment comprising a curvilinear body adapted to embrace the outer side of the core and a plurality of spaced flexible metal fins within said holder between which the individual cords are received and releasably confined.

9. In a cord tire building machine, a cord holder for positioning the cords upon a tire forming core consisting of a rigid one-piece curvilinear part corresponding to a circumferential section of the core and conforming in cross sectional contour therewith and adapted to embrace the core body at each side of its tread portion, and means carried by said holder for releasably retaining a multiplicity of cords therein in predetermined angular relation to the axis of the tire forming core.

10. In a cord tire building machine, a cord holder for positioning the cords upon a tire forming core consisting of a single curvilinear part corresponding to a circumferential section of the core and conforming in cross sectional contour therewith and adapted to embrace the core body, and a plurality of spaced relatively yieldable elements secured within the core holder between which the individual cords are releasably confined and held in predetermined angular relation with respect to the axis of the tire forming core.

11. In a cord tire building machine, means for clamping a layer of cords upon a tire forming core, including a head axially movable with relation to the core, cord clamping means carried by said head, eccentrics coacting with the head to move the same alternately in opposite directions, and means for actuating said eccentrics.

12. In a cord tire building machine, means for clamping a layer of cords upon a tire forming core, including a head axially movable with relation to the core, clamping means carried by the head, eccentrics arranged in pairs at opposite sides at the axial center of the head and coacting with said head to move the same, and means for actuating said eccentrics.

13. In a cord tire building machine, means for clamping a layer of cords upon a tire forming core, including a head axially movable with relation to the core, clamping means carried by the head, eccentrics arranged in pairs at opposite sides at the axial center of the head and coacting with said head to move the same, means for actuating said eccentrics, said actuating means including adjustable means for regulating the throw of the eccentrics.

14. In a cord tire building machine, means for clamping a layer of cords upon a tire forming core including a head axially movable with relation to the core and provided with spaced yokes arranged upon opposite sides of the axis of said head, a pair of eccentrics operating within each of said yokes, and means for actuating said eccentrics to move the head alternately in opposite directions.

15. In a cord tire building machine, means for clamping the ends of a layer of cords upon opposite sides of a tire forming core including opposed axially movable heads arranged at relatively opposite sides of the core, cord end clamping means carried by each head, eccentrics coacting with the respective heads to simultaneously move the same in relatively opposite directions and means for actuating said eccentrics.

16. In combination with a tire forming core having cord end seating flanges, means for clamping the ends of a cord layer embracing the core upon said flanges including heads axially movable towards and from the opposite sides of the core, an annular cord end clamping member carried by each of the heads and having means to frictionally coact with the core flange to retain said member in clamping engagement with the cord ends when the head is retracted, and means for axially reciprocating said heads in unison to simultaneously clamp the ends of the cord layer upon said flanges.

17. In a cord tire building machine, means for clamping one end of a cord layer upon a tire forming core, including a head axially movable with respect to the core, a cord clamping member, a carrier for said member detachably connected to said head, means connected to the carrier for attaching the same to said head and detaching said carrier therefrom, and means for reciprocating said head to clampingly engage said member with the end of the cord layer.

18. In combination with a tire forming core, means for clamping one end of a cord layer upon said core including a head axially movable with respect to the core, a clamping ring for engagement with the end of the cord layer, an annular carrier for said clamping ring, said head and the carrier having co-acting means whereby the carrier may be attached to the head or detached therefrom by a relative circumferential movement, means for axially shifting the head to engage the clamping ring upon the end of the cord layer, and means connected to said annular carrier to circumferentially shift the same relative to the head, said means having parts engaging the core when the carrier has been detached from the head whereby said carrier, together with the core, may be removed from the machine.

19. In combination with a tire forming core, means for clamping one end of a cord layer upon said core including a head axially movable with respect to the core, a clamping ring for engagement with the end of the cord layer, an annular carrier for said clamping ring, said head and the carrier having coacting means whereby the carrier may be attached to the head or detached therefrom by a relative circumferential movement, means for axially shifting the head to engage the clamping ring upon the end of the cord layer, a plurality of levers pivotally connected to the annular carrier and whereby said carrier may be circumferentially shifted to attach the same to the head or detach said carrier therefrom, said levers terminating at one of their ends in lifting hooks, and means for pivotally moving said levers upon the carrier when the latter is disconnected from the head to engage said hooks with the tire forming core, whereby the carrier, together with the core, may be removed from the machine.

20. In a machine for building cord tires, in combination with a tire forming core an annular member for clamping engagement upon one end of a cord layer to retain the same in applied position upon the core body, a carrier for said clamping member, means for reciprocating the carrier axially with respect to the core for the application of the clamping member to the end of the cord layer, and means connected to said carrier and adapted to be engaged with the core whereby said carrier, together with the core, may be removed from the machine.

21. In a machine for building cord tires, in combination with a tire forming core, an annular member for clamping an engagement upon one end of a cord layer to retain the same in applied position upon the cord body, a carrier for said clamping member, means for reciprocating the carrier axially with respect to the core for the application of the clamping member to the end of the cord layer, diametrically opposed levers pivotally connected to the carrier and terminating at one of their ends in lifting hooks, and means for pivotally moving said levers with respect to the annular carrier to engage the hooks with said core whereby said carrier, together with the core, may be removed from the machine.

22. In a cord tire building machine, in combination with a tire forming core, a clamping ring adapted to be engaged with the end of a cord layer applied upon said core, an annular carrier for the clamping ring, means for reciprocating the carrier axially with respect to the core, including spaced parts having means with which parts on the carrier coact to support the annular carrier in operative relation to the core, and means for detaching the annular carrier from said spaced parts including a plurality of levers pivotally mounted upon the carrier, and means for pivotally moving the levers upon the carrier to engage the same with the tire forming core when the carrier is detached from said spaced parts whereby said carrier, together with core, may be removed from the machine.

23. Means for clamping a series of superposed cord layers upon a tire forming core comprising a plurality of annular clamping members, each having means frictionally coacting with the corresponding means of an adjacent clamping member to retain said members in superposed relation and against relative movement in clamping engagement upon the individual cord layers.

24. Means for clamping a plurality of superposed cord layers and holding the same under tension upon a core body comprising, in combination with a tire forming core, a plurality of annular clamping members adapted for arrangement in superposed relation upon each side of the core with the marginal edges of the cord layers disposed between the adjacent clamping members, the inner cord layer having its edges disposed between the innermost clamping member in each series and parts of the tire forming core, said clamping members have circumferentially continuous angular shoulders to frictionally engage each other, and the shoulders of the inner clamping members frictionally coacting with the forming core whereby the superposed clamping members are retained in assembled relation in clamping engagement with the respective cord layers and against displacement relative to the tire forming core.

25. In the manufacture of cord tires, a clamping ring for engagement upon the marginal edge of a circumferentially continuous cord layer to retain the same in position upon a tire forming core, said ring having an angular circumferentially continuous shoulder intermediate of its inner and outer edges having a groove in its outer peripheral face, and a resilient friction band normally projecting beyond the face of said shoulder and expansible and contractible in the groove thereof, said band adapted for frictional engagement with the inner face of a similar shoulder on a second clamping ring when the rings are arranged in nested superposed relation.

26. In the manufacture of cord tires, a clamping ring for engagement upon the marginal edge of a circumferentially continuous cord layer to retain the same in position upon a tire forming core, said ring having an angular circumferentially continuous shoulder intermediate of its inner and outer edges having a groove in its outer peripheral face, and a resilient friction band normally projecting beyond the face of said shoulder and expansible and contractible in the groove thereof, said band adapted for frictional engagement with the inner face of a similar shoulder on a second clamping ring when the rings are arranged in nested superposed relation, the clamping ring being further provided with a circumferentially elongated opening and the ends of the friction band being angularly disposed and engaged in said opening for free relative movement in the expansion and contraction of said band.

27. In a cord tire building machine, in combination with a tire forming core, a cord holder mounted for movement from a cord receiving position into the plane of the core, means for moving the cord holder from one position to the other, and additional means for moving said holder when positioned in the plane of the core to apply the cord held thereby to the peripheral surface of the core.

28. In a cord tire building machine, a cord holder for positioning the cords upon a tire forming core, said holder consisting of a channel shaped member adapted to receive the tire forming core and having means on its inner face for releasably confining a plurality of spaced cords in definite angular relation to the longitudinal axis of said holder.

In testimony that I claim the foregoing as my invention, I have signed my name hereunder.

KNUT O. B. TEXTORIUS.